United States Patent
Cox et al.

(10) Patent No.: US 11,993,000 B2
(45) Date of Patent: May 28, 2024

(54) METHODS OF USING THERMOPLASTIC POLYURETHANES IN FUSED DEPOSITION MODELING AND SYSTEMS AND ARTICLES THEREOF

(71) Applicant: Lubrizol Advanced Materials, Inc., Cleveland, OH (US)

(72) Inventors: John M. Cox, Broadview Heights, OH (US); Joseph J. Vontorcik, Jr., Broadview Heights, OH (US); Edward W. Ault, Grafton, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 303 days.

(21) Appl. No.: 17/321,696

(22) Filed: May 17, 2021

(65) Prior Publication Data

US 2021/0268718 A1 Sep. 2, 2021

Related U.S. Application Data

(60) Continuation of application No. 15/958,695, filed on Apr. 20, 2018, now abandoned, which is a division of application No. 15/111,277, filed as application No. PCT/US2015/011687 on Jan. 16, 2015, now abandoned.

(60) Provisional application No. 61/928,429, filed on Jan. 17, 2014.

(51) Int. Cl.
| | |
|---|---|
| *B29C 64/118* | (2017.01) |
| *B29C 64/112* | (2017.01) |
| *B33Y 10/00* | (2015.01) |
| *B33Y 30/00* | (2015.01) |
| *B33Y 50/02* | (2015.01) |
| *B33Y 70/10* | (2020.01) |
| *C08J 5/00* | (2006.01) |
| *C08L 75/06* | (2006.01) |
| *C08L 75/08* | (2006.01) |
| *B29K 75/00* | (2006.01) |
| *B29L 31/00* | (2006.01) |
| *B33Y 70/00* | (2020.01) |

(52) U.S. Cl.
CPC .......... *B29C 64/118* (2017.08); *B29C 64/112* (2017.08); *B33Y 10/00* (2014.12); *B33Y 30/00* (2014.12); *B33Y 50/02* (2014.12); *B33Y 70/10* (2020.01); *C08J 5/00* (2013.01); *C08L 75/06* (2013.01); *C08L 75/08* (2013.01); *B29K 2075/00* (2013.01); *B29L 2031/753* (2013.01); *B33Y 70/00* (2014.12); *C08J 2375/06* (2013.01); *C08J 2375/08* (2013.01)

(58) Field of Classification Search
CPC ..... B29C 64/118; B29C 64/112; B33Y 10/00; B33Y 30/00; B33Y 50/02; B33Y 70/00; B33Y 70/10; C08J 5/00; C08J 2375/06; C08L 75/06; C08L 75/08; B29K 2075/00; B29L 2031/753
USPC .......................................................... 425/162
See application file for complete search history.

(56) References Cited

U.S. PATENT DOCUMENTS

| | | | |
|---|---|---|---|
| 2004/0087739 A1* | 5/2004 | Onder ................ | C08G 18/4854 525/453 |
| 2005/0280184 A1* | 12/2005 | Sayers .................... | B29C 64/40 264/308 |
| 2013/0156952 A1* | 6/2013 | Keinath ................ | B29C 64/112 427/256 |

* cited by examiner

*Primary Examiner* — Nahida Sultana
*Assistant Examiner* — Lawrence D. Hohenbrink, Jr.
(74) *Attorney, Agent, or Firm* — Eryn Ace Fuhrer; Michael A. Miller

(57) ABSTRACT

The present invention relates to systems and methods for solid freeform fabrication, especially fused deposition modeling, as well as various articles made using the same, where the systems and methods utilize certain thermoplastic polyurethanes which are particularly suited for such processing. The useful thermoplastic polyurethanes are derived from (a) a polyisocyanate component, (b) a polyol component, and (c) an optional chain extender component where the resulting thermoplastic polyurethane has a crystallization temperature above 80° C. and retains more than 20% of its shear storage modulus at 100° C. relative to its shear storage modulus at 20° C.

13 Claims, No Drawings

METHODS OF USING THERMOPLASTIC POLYURETHANES IN FUSED DEPOSITION MODELING AND SYSTEMS AND ARTICLES THEREOF

This application is a continuation of application Ser. No. 15/958,695 filed on Apr. 20, 2018, which is a divisional of application Ser. No. 15/111,277 filed on Jul. 13, 2016 which claims priority from PCT Application Serial No. PCT/US2015/011687 filed on Jan. 16, 2015, which claims the benefit of U.S. Provisional Application No. 61/928,429 filed on Jan. 17, 2014, the entirety of all of which are hereby incorporated by reference.

FIELD OF THE INVENTION

The present invention relates to systems and methods for solid freeform fabrication, especially fused deposition modeling, as well as various articles made using the same, where the systems and methods utilize certain thermoplastic polyurethanes which are particularly suited for such processing. The useful thermoplastic polyurethanes are derived from (a) a polyisocyanate component, (b) a polyol component, and (c) an optional chain extender component where the resulting thermoplastic polyurethane has a crystallization temperature above 80° C. and retains more than 20% of its shear storage modulus at 100° C. relative to its shear storage modulus at 20° C.

BACKGROUND

The present invention relates to solid freeform fabrication and, more particularly, fused deposition modeling, using certain thermoplastic polyurethanes.

Solid Freeform Fabrication (SFF) is a technology enabling fabrication of arbitrarily shaped structures directly from computer data via additive formation steps. The basic operation of any SFF system consists of slicing a three-dimensional computer model into thin cross sections, translating the result into two-dimensional position data and feeding the data to control equipment which fabricates a three-dimensional structure in a layerwise manner.

Solid freeform fabrication entails many different approaches to the method of fabrication, including three-dimensional printing, electron beam melting, stereolithography, selective laser sintering, laminated object manufacturing, fused deposition modeling and others.

In three-dimensional printing processes, for example, a building material is dispensed from a dispensing head having a set of nozzles to deposit layers on a supporting structure. Depending on the building material, the layers may then be cured or solidified using a suitable device. The building material may include modeling material, which forms the object, and support material, which supports the object as it is being built.

Solid freeform fabrication is typically used in design-related fields where it is used for visualization, demonstration and mechanical prototyping. Thus, SFF facilitates rapid fabrication of functioning prototypes with minimal investment in tooling and labor. Such rapid prototyping shortens the product development cycle and improves the design process by providing rapid and effective feedback to the designer. SFF can also be used for rapid fabrication of non-functional parts, e.g., for the purpose of assessing various aspects of a design such as aesthetics, fit, assembly and the like. Additionally, SFF techniques have been proven to be useful in the fields of medicine, where expected outcomes are modeled prior to performing procedures. It is recognized that many other areas can benefit from rapid prototyping technology, including, without limitation, the fields of architecture, dentistry and plastic surgery where the visualization of a particular design and/or function is useful.

There is growing interest in this form of fabrication. Many materials have been considered for use in such systems and methods using the same, however, thermoplastic polyurethanes have proven difficult to utilize in these systems and methods. This is due at least in part to the fact that the flexibility of the TPU materials can make it challenging to force the material through the melt chamber of FDM processing equipment. The low crystallization rate of TPU can also make it difficult to maintain tolerances when laying down the melt stream onto the parts being built. Further, the broad melt range for TPU materials can make viscosity control somewhat challenging.

Given the attractive combination of properties thermoplastic polyurethanes may offer, and the wide variety of articles made using more conventional means of fabrication, there is a growing need to identify and/or develop thermoplastic polyurethanes well suited for solid freeform fabrication, and particularly fused deposition modeling.

SUMMARY

The disclosed technology provides a system for solid freeform fabrication of a three-dimensional object, comprising: a solid freeform fabrication apparatus that deposits small beads of building materials in a controlled manner; wherein said building materials comprises a thermoplastic polyurethane derived from (a) a polyisocyanate component, (b) a polyol component, and (c) an optional chain extender component; wherein the resulting thermoplastic polyurethane has a crystallization temperature above 80° C.; and wherein the resulting thermoplastic polyurethane retains more than 20% of its shear storage modulus at 100° C. relative to its shear storage modulus at 20° C.

The disclosed technology also provides a method of fabricating a three-dimensional object, comprising the step of: (I) operating a system for solid freeform fabrication of an object; wherein said system comprises a solid freeform fabrication apparatus that deposits small beads of building materials in a controlled manner; so as to form the three-dimensional object; wherein said building materials comprises a thermoplastic polyurethane derived from (a) a polyisocyanate component, (b) a polyol component, and (c) an optional chain extender component; wherein the resulting thermoplastic polyurethane has a crystallization temperature above 80° C.; and wherein the resulting thermoplastic polyurethane retains more than 20% of its shear storage modulus at 100° C. relative to its shear storage modulus at 20° C. Any of the thermoplastic polyurethane described herein may be used in the described methods.

The disclosed technology also provides an article of manufacturing, fabricated by a system for solid freeform fabrication of an object, comprising: a solid freeform fabrication apparatus that deposits small beads of building materials in a controlled manner; wherein said building materials comprises a thermoplastic polyurethane derived from (a) a polyisocyanate component, (b) a polyol component, and (c) an optional chain extender component; wherein the resulting thermoplastic polyurethane has a crystallization temperature above 80° C.; and wherein the resulting thermoplastic polyurethane retains more than 20% of its shear storage modulus at 100° C. relative to its shear storage modulus at 20° C. Any of the thermoplastic polyurethane described herein may be used to prepare the described articles.

In some embodiments of the systems or methods or articles described herein, the thermoplastic polyurethane has a crystallization temperature greater than 100, 105, 110, or even greater than 115° C., or even of about 117° C. In some embodiments, the crystallization temperature is no more than 200, 150, or even 120° C.

In some embodiments of the systems or methods or articles described herein, the thermoplastic polyurethane retains more than 50% of its shear storage modulus at 50° C. relative to its shear storage modulus at 20° C.; retains more than 42% of its shear storage modulus at 100° C. relative to its shear storage modulus at 50° C.; retains more than 20% of its shear storage modulus at 150° C. relative to its shear storage modulus at 120° C.; or any combination thereof.

In some embodiments of the systems or methods or articles described herein, the thermoplastic polyurethane retains more than 60% of its shear storage modulus at 50° C. relative to its shear storage modulus at 20° C.; retains more than 30% of its shear storage modulus at 100° C. relative to its shear storage modulus at 20° C.; or any combination thereof.

In some embodiments of the systems or methods or articles described herein, the thermoplastic polyurethane retains more than 45% of its shear storage modulus at 100° C. relative to its shear storage modulus at 50° C.; retains more than 70% of its shear storage modulus at 120° C. relative to its shear storage modulus at 100° C.; retains more than 5% of its shear storage modulus at 105° C. relative to its shear storage modulus at 20° C.; or any combination thereof.

The disclosed technology also provides for the described systems or methods or articles described herein, wherein the solid freeform fabrication apparatus comprises (a) a plurality of dispensing heads; (b) a building material supply apparatus configured to supply a plurality of building materials to said fabrication apparatus; and (c) a control unit configured for controlling said fabrication apparatus and said building material supply apparatus, based on an operation mode selected from a plurality of predetermined operation modes.

The solid freeform fabrication apparatus may comprise and/or be described as three-dimensional printing, electron beam melting, stereolithography, selective laser sintering, laminated object manufacturing, fused deposition modeling, or some combination thereof. In some embodiments, the solid freeform fabrication apparatus may comprise and/or be described as three-dimensional printing, electron beam melting, stereolithography, laminated object manufacturing, fused deposition modeling, or some combination thereof. In some of these embodiments, the solid freeform fabrication apparatus may exclude selective laser sintering.

The solid freeform fabrication apparatus may comprise a fused deposition modeling (FDM) apparatus, which may also be referred to as a fused filament fabrication (FFF) apparatus.

The disclosed technology provides for the described system or method or article wherein the thermoplastic polyurethane is characterized in that mole ratio of the chain extender to the polyol used to prepare the thermoplastic polyurethane (and/or present in the thermoplastic polyurethane) is greater than 1.5. In other embodiments, the ratio is greater than 2.0, or even greater than 3.5, 3.6, 3.7, or even greater than 3.8.

The disclosed technology provides for the described system or method or article wherein the thermoplastic polyurethane is characterized in that the polyol has a number average molecular weight of at least 900. In some embodiments, the polyol may have a molecular weight of at least 900, at least 1,000, at least 1,500, at least 1,750 or even about 2,000. In some embodiments, the polyol may have a molecular weight of no more than 5,000, 4,000, 3,000, or even 2,500 or 2,000.

The disclosed technology provides for the described system or method or article wherein the thermoplastic polyurethane is characterized in that the polyisocyanate component comprises an aromatic diisocyanate, for example, 4,4'-methylenebis(phenyl isocyanate).

The disclosed technology provides for the described system or method or article wherein the thermoplastic polyurethane is characterized in that the polyol component comprises a polyether polyol, a polyester polyol, or a combination thereof. Useful examples include poly(tetramethylene ether glycol), polybutylene adipate, or a combination thereof.

The disclosed technology provides for the described system or method or article wherein the thermoplastic polyurethane is characterized in that the chain extender component comprises a linear alkylene diol, for example, 1,4-butanediol.

The disclosed technology provides for the described system or method or article wherein the thermoplastic polyurethane is characterized in the thermoplastic polyurethane further comprises one or more colorants, antioxidants (including phenolics, phosphites, thioesters, and/or amines), antiozonants, stabilizers, inert fillers, lubricants, inhibitors, hydrolysis stabilizers, light stabilizers, hindered amines light stabilizers, benzotriazole UV absorber, heat stabilizers, stabilizers to prevent discoloration, dyes, pigments, inorganic and organic fillers, reinforcing agents, or any combinations thereof.

The disclosed technology provides for the described article wherein said article comprises cook and storage ware, furniture, automotive components, toys, sportswear, medical devices, personalized medical articles, replicated medical implants, dental articles, sterilization containers, drapes, gowns, filters, hygiene products, diapers, films, sheets, tubes, pipes, wire jacketing, cable jacketing, agricultural films, geomembranes, sporting equipment, cast film, blown film, profiles, boat and water craft components, crates, containers, packaging, labware, office floor mats, instrumentation sample holders, liquid storage containers, packaging material, medical tubing and valves, a sheet, a tape, a carpet, an adhesive, a wire sheath, a cable, a protective apparel, an automotive part, a coating, a foam laminate, an overmolded article, an automotive skin, an awning, a tarp, a leather article, a roofing construction article, a steering wheel, a powder coating, a powder slush molding, a consumer durable, a grip, a handle, a hose, a hose liner, a pipe, a pipe liner, a caster wheel, a skate wheel, a computer component, a belt, an applique, a footwear component, a conveyor or timing belt, a glove, a fiber, a fabric, or a garment.

DETAILED DESCRIPTION

Various preferred features and embodiments will be described below by way of non-limiting illustration.

The disclosed technology provides systems for solid freeform fabrication of a three-dimensional objects and/or articles. Also provided are methods of using such systems and articles made using such systems and/or methods. The disclosed technology provides these systems, methods, and articles where certain thermoplastic polyurethanes are used, more specifically thermoplastic polyurethanes derived from (a) a polyisocyanate component, (b) a polyol component, and (c) an optional chain extender component; wherein the resulting thermoplastic polyurethane has a crystallization temperature above 80° C.; and wherein the resulting thermoplastic polyurethane retains more than 20% of its shear storage modulus at 100° C. relative to its shear storage modulus at 20° C. It has been found that the described thermoplastic polyurethanes are particularly well suited for use in solid freeform fabrication systems and methods, particularly fused deposition modeling. The described thermoplastic polyurethanes overcome the barriers previously seen when such materials have been used in solid freeform fabrication, particularly fused deposition modeling, and allow the use of these versatile materials in these manufacturing processes and systems of growing importance.

The Thermoplastic Polyurethanes.

The thermoplastic polyurethanes useful in the described technology are derived from (a) a polyisocyanate component, (b) a polyol component, and (c) an optional chain extender component; wherein the resulting thermoplastic polyurethane has a crystallization temperature above 80° C.; and wherein the resulting thermoplastic polyurethane retains more than 20% of its shear storage modulus at 100° C. relative to its shear storage modulus at 20° C.

The TPU compositions described herein are made using (a) a polyisocyanate component. The polyisocyanate and/or polyisocyanate component includes one or more polyisocyanates. In some embodiments, the polyisocyanate component includes one or more diisocyanates.

In some embodiments, the polyisocyanate and/or polyisocyanate component includes an alpha, omega-alkylene diisocyanate having from 5 to 20 carbon atoms.

Suitable polyisocyanates include aromatic diisocyanates, aliphatic diisocyanates, or combinations thereof. In some embodiments, the polyisocyanate component includes one or more aromatic diisocyanates. In some embodiments, the polyisocyanate component is essentially free of, or even completely free of, aliphatic diisocyanates. In other embodiments, the polyisocyanate component includes one or more aliphatic diisocyanates. In some embodiments, the polyisocyanate component is essentially free of, or even completely free of, aromatic diisocyanates.

Examples of useful polyisocyanates include aromatic diisocyanates such as 4,4"-methylenebis(phenyl isocyanate) (MDI), m-xylene diisocyanate (XDI), phenylene-1,4-diisocyanate, naphthalene-1,5-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, lysine diisocyanate (LDI), 1,4-butane diisocyanate (BDI), isophorone diisocyanate (PDI), 3,3'-dimethyl-4,4'-biphenylene diisocyanate (TODI), 1,5-naphthalene diisocyanate (NDI), and dicyclohexylmethane-4,4"-diisocyanate (H12MDI). Mixtures of two or more polyisocyanates may be used. In some embodiments, the polyisocyanate is MDI and/or H12MDI. In some embodiments, the polyisocyanate includes MDI. In some embodiments, the polyisocyanate includes H12MDI.

In some embodiments, the thermoplastic polyurethane is prepared with a polyisocyanate component that includes H12MDI. In some embodiments, the thermoplastic polyurethane is prepared with a polyisocyanate component that consists essentially of H12MDI. In some embodiments, the thermoplastic polyurethane is prepared with a polyisocyanate component that consists of H12MDI.

In some embodiments, the thermoplastic polyurethane is prepared with a polyisocyanate component that includes (or consists essentially of, or even consists of) H12MDI and at least one of MDI, HDI, TDI, IPDI, LDI, BDI, PDI, CHDI, TODI, and NDI.

In some embodiments, the polyisocyanate used to prepare the TPU and/or TPU compositions described herein is at least 50%, on a weight basis, a cycloaliphatic diisocyanate. In some embodiments, the polyisocyanate includes an alpha, omega-alkylene diisocyanate having from 5 to 20 carbon atoms.

In some embodiments, the polyisocyanate used to prepare the TPU and/or TPU compositions described herein includes hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethyl ene diisocyanate, or combinations thereof.

In some embodiments, the polyisocyanate component comprises an aromatic diisocyanate. In some embodiments, the polyisocyanate component comprises 4,4'-methylenebis (phenyl isocyanate).

The TPU compositions described herein are made using (b) a polyol component. Polyols include polyether polyols, polyester polyols, polycarbonate polyols, polysiloxane polyols, and combinations thereof.

Suitable polyols, which may also be described as hydroxyl terminated intermediates, when present, may include one or more hydroxyl terminated polyesters, one or more hydroxyl terminated polyethers, one or more hydroxyl terminated polycarbonates, one or more hydroxyl terminated polysiloxanes, or mixtures thereof.

Suitable hydroxyl terminated polyester intermediates include linear polyesters having a number average molecular weight (Mn) of from about 500 to about 10,000, from about 700 to about 5,000, or from about 700 to about 4,000, and generally have an acid number less than 1.3 or less than 0.5. The molecular weight is determined by assay of the terminal functional groups and is related to the number average molecular weight. The polyester intermediates may be produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is a preferred acid. The glycols which are reacted to form a desirable polyester intermediate can be aliphatic, aromatic, or combinations thereof, including any of the glycols described above in the chain extender section, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

The polyol component may also include one or more polycaprolactone polyester polyols. The polycaprolactone polyester polyols useful in the technology described herein include polyester diols derived from caprolactone monomers. The polycaprolactone polyester polyols are terminated by primary hydroxyl groups. Suitable polycaprolactone polyester polyols may be made from ε-caprolactone and a bifunctional initiator such as diethylene glycol, 1,4-butanediol, or any of the other glycols and/or diols listed herein. In some embodiments, the polycaprolactone polyester polyols are linear polyester diols derived from caprolactone monomers.

Useful examples include CAPA™ 2202A, a 2000 number average molecular weight (Mn) linear polyester diol, and CAPA™ 2302A, a 3000 Mn linear polyester diol, both of which are commercially available from Perstorp Polyols Inc. These materials may also be described as polymers of 2-oxepanone and 1,4-butanediol.

The polycaprolactone polyester polyols may be prepared from 2-oxepanone and a diol, where the diol may be 1,4-butanediol, diethylene glycol, monoethylene glycol, 1,6-hexanediol, 2,2-dimethyl-1,3-propanediol, or any combination thereof. In some embodiments, the diol used to prepare the polycaprolactone polyester polyol is linear. In some embodiments, the polycaprolactone polyester polyol is prepared from 1,4-butanediol. In some embodiments, the polycaprolactone polyester polyol has a number average molecular weight from 500 to 10,000, or from 500 to 5,000, or from 1,000 or even 2,000 to 4,000 or even 3000.

Suitable hydroxyl terminated polyether intermediates include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethylene ether glycol) comprising water reacted with tetrahydrofuran which can also be described as polymerized tetrahydrofuran, and which is commonly referred to as PTMEG. In some embodiments, the polyether intermediate includes PTMEG. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the described compositions. Typical copolyethers include the reaction product of THF and ethylene oxide or THF and propylene oxide. These are available from BASF as PolyTHF® B, a block copolymer, and poly THF® R, a random copolymer. The various polyether intermediates generally have a number average molecular weight (Mn) as determined by assay of the terminal functional groups which is an average molecular weight greater than about 700, such as from about 700 to about 10,000, from about 1,000 to about 5,000, or from about 1,000 to about 2,500. In some embodiments, the polyether intermediate includes a blend of two or more different molecular weight polyethers, such as a blend of 2,000 $M_n$ and 1000 $M_n$ PTMEG.

Suitable hydroxyl terminated polycarbonates include those prepared by reacting a glycol with a carbonate. U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and or even 4 to 12 carbon atoms, and from polyoxyalkylene glycols containing 2 to 20 alkoxy groups per molecule with each alkoxy group containing 2 to 4 carbon atoms. Suitable diols include aliphatic diols containing 4 to 12 carbon atoms such as 1,4-butanediol, 1,5-pentanediol, neopentyl glycol, 1,6-hexanediol, 2,2,4-trimethyl-1,6-hexanediol, 1,10-decanediol, hydrogenated dilinoleylglycol, hydrogenated dioleylglycol, 3-methyl-1,5-pentanediol; and cycloaliphatic diols such as 1,3-cyclohexanediol, 1,4-dimethylolcyclohexane, 1,4-cyclohexanediol-, 1,3-dimethylolcyclohexane-, 1,4-endomethylene-2-hydroxy-5-hydroxymethyl cyclohexane, and polyalkylene glycols. The diols used in the reaction may be a single diol or a mixture of diols depending on the properties desired in the finished product. Polycarbonate intermediates which are hydroxyl terminated are generally those known to the art and in the literature. Suitable carbonates are selected from alkylene carbonates composed of a 5 to 7 member ring. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate. Also, suitable herein are dialkylcarbonates, cycloaliphatic carbonates, and diarylcarbonates. The dialkylcarbonates can contain 2 to 5 carbon atoms in each alkyl group and specific examples thereof are diethyl carbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Examples of suitable diarylcarbonates, which can contain 6 to 20 carbon atoms in each aryl group, are diphenylcarbonate, ditolylcarbonate, and dinaphthylcarbonate.

Suitable polysiloxane polyols include alpha-omega-hydroxyl or amine or carboxylic acid or thiol or epoxy terminated polysiloxanes. Examples include poly(dimethysiloxane) terminated with a hydroxyl or amine or carboxylic acid or thiol or epoxy group. In some embodiments, the polysiloxane polyols are hydroxyl terminated polysiloxanes. In some embodiments, the polysiloxane polyols have a number-average molecular weight in the range from 300 to 5,000, or from 400 to 3,000.

Polysiloxane polyols may be obtained by the dehydrogenation reaction between a polysiloxane hydride and an aliphatic polyhydric alcohol or polyoxyalkylene alcohol to introduce the alcoholic hydroxy groups onto the polysiloxane backbone.

In some embodiments, the polysiloxanes may be represented by one or more compounds having the following formula:

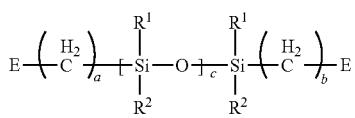

in which: each $R^1$ and $R^2$ are independently a 1 to 4 carbon atom alkyl group, a benzyl, or a phenyl group; each E is OH or $NHR^3$ where $R^3$ is hydrogen, a 1 to 6 carbon atoms alkyl group, or a 5 to 8 carbon atoms cyclo-alkyl group; a and b are each independently an integer from 2 to 8; c is an integer from 3 to 50. In amino-containing polysiloxanes, at least one of the E groups is $NHR^3$. In the hydroxyl-containing polysiloxanes, at least one of the E groups is OH. In some embodiments, both $R^1$ and $R^2$ are methyl groups.

Suitable examples include alpha-omega-hydroxypropyl terminated poly(dimethysiloxane) and alpha-omega-amino propyl terminated poly(dimethysiloxane), both of which are commercially available materials. Further examples include copolymers of the poly(dimethysiloxane) materials with a poly(alkylene oxide).

The polyol component, when present, may include poly(ethylene glycol), poly(tetramethylene ether glycol), poly(trimethylene oxide), ethylene oxide capped poly(propylene glycol), poly(butylene adipate), poly(ethylene adipate), poly(hexamethylene adipate), poly(tetramethylene-co-hexamethylene adipate), poly(3-methyl-1,5-pentamethyl ene adipate), polycaprolactone diol, poly(hexamethylene carbonate) glycol, poly(pentamethylene carbonate) glycol, poly(trimethylene carbonate) glycol, dimer fatty acid based polyester polyols, vegetable oil based polyols, or any combination thereof.

Examples of dimer fatty acids that may be used to prepare suitable polyester polyols include Priplast™ polyester glycols/polyols commercially available from Croda and Radia® polyester glycols commercially available from Oleon.

In some embodiments, the polyol component includes a polyether polyol, a polycarbonate polyol, a polycaprolactone polyol, or any combination thereof.

In some embodiments, the polyol component includes a polyether polyol. In some embodiments, the polyol component is essentially free of or even completely free of polyester polyols. In some embodiments, the polyol component used to prepare the TPU is substantially free of, or even completely free of polysiloxanes.

In some embodiments, the polyol component includes ethylene oxide, propylene oxide, butylene oxide, styrene oxide, poly(tetramethylene ether glycol), poly(propylene glycol), poly(ethylene glycol), copolymers of poly(ethylene glycol) and poly(propylene glycol), epichlorohydrin, and the like, or combinations thereof. In some embodiments, the polyol component includes poly(tetramethylene ether glycol).

In some embodiments, the polyol has a number average molecular weight of at least 900. In other embodiments, the polyol has a number average molecular weight of at least 900, 1,000, 1,500, 1,750, and/or a number average molecular weight up to 5,000, 4,000, 3,000, 2,500, or even 2,000.

In some embodiments, the polyol component comprises a polyether polyol, a polyester polyol, or a combination thereof. In some embodiments, the polyol component comprises poly(tetramethylene ether glycol), polybutylene adipate, or a combination thereof. In some embodiments, the polyol component comprises poly(tetramethylene ether glycol). In some embodiments, the polyol component comprises polybutylene adipate.

The TPU compositions described herein are made using c) a chain extender component. Chain extenders include diols, diamines, and combination thereof.

Suitable chain extenders include relatively small polyhydroxy compounds, for example, lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy) phenyl] propane (HEPP), hexamethylenediol, heptanediol, nonanediol, dodecanediol, 3-methyl-1,5-pentanediol, ethylenediamine, butanediamine, hexamethylenediamine, and hydroxyethyl resorcinol (HER), and the like, as well as mixtures thereof. In some embodiments, the chain extender includes BDO, HDO, 3-methyl-1,5-pentanediol, or a combination thereof. In some embodiments, the chain extender includes BDO. Other glycols, such as aromatic glycols could be used, but in some embodiments the TPUs described herein are essentially free of or even completely free of such materials.

In some embodiments, the chain extender used to prepare the TPU is substantially free of, or even completely free of, 1,6-hexanediol. In some embodiments, the chain extender used to prepare the TPU includes a cyclic chain extender. Suitable examples include CHDM, HEPP, HER, and combinations thereof. In some embodiments, the chain extender used to prepare the TPU includes an aromatic cyclic chain extender, for example, HEPP, HER, or a combination thereof. In some embodiments, the chain extender used to prepare the TPU includes an aliphatic cyclic chain extender, for example, CHDM. In some embodiments, the chain extender used to prepare the TPU is substantially free of, or even completely free of aromatic chain extenders, for example, aromatic cyclic chain extenders. In some embodiments, the chain extender used to prepare the TPU is substantially free of, or even completely free of polysiloxanes.

In some embodiments, the chain extender component includes 1,4-butanediol, 2-ethyl-1,3-hexanediol, 2,2,4-trimethyl pentane-1,3-diol, 1,6-hexanediol, 1,4-cyclohexane dimethylol, 1,3-propanediol, 3-methyl-1,5-pentanediol or combinations thereof. In some embodiments, the chain extender component includes 1,4-butanediol, 3-methyl-1,5-pentanediol or combinations thereof. In some embodiments, the chain extender component includes 1,4-butanediol.

In some embodiments, the chain extender component comprises a linear alkylene diol. In some embodiments, the chain extender component comprises 1,4-butanediol.

In some embodiments, the mole ratio of the chain extender to the polyol is greater than 1.5. In other embodiments, the mole ratio of the chain extender to the polyol is at least (or greater than) 1.5, 2.0, 3.5, 3.7, or even 3.8 and/or the mole ratio of the chain extender to the polyol may go up to 5.0, or even 4.0.

The thermoplastic polyurethanes described herein may also be considered to be thermoplastic polyurethane (TPU) compositions. In such embodiments, the compositions may contain one or more TPU. These TPU are prepared by reacting: a) the polyisocyanate component described above; b) the polyol component described above; and c) the chain extender component described above, where the reaction may be carried out in the presence of a catalyst. At least one of the TPU in the composition must meet the parameters described above making it suitable for solid freeform fabrication, and in particular fused deposition modeling.

The means by which the reaction is carried out is not overly limited, and includes both batch and continuous processing. In some embodiments, the technology deals with batch processing of aliphatic TPU. In some embodiments, the technology deals with continuous processing of aliphatic TPU.

The described compositions include the TPU materials described above and also TPU compositions that include such TPU materials and one or more additional components. These additional components include other polymeric materials that may be blended with the TPU described herein. These additional components include one or more additives that may be added to the TPU, or blend containing the TPU, to impact the properties of the composition.

The TPU described herein may also be blended with one or more other polymers. The polymers with which the TPU described herein may be blended are not overly limited. In some embodiments, the described compositions include two or more of the described TPU materials. In some embodiments, the compositions include at least one of the described TPU materials and at least one other polymer, which is not one of the described TPU materials.

Polymers that may be used in combination with the TPU materials described herein also include more conventional TPU materials such as non-caprolactone polyester-based TPU, polyether-based TPU, or TPU containing both non-caprolactone polyester and polyether groups. Other suitable materials that may be blended with the TPU materials described herein include polycarbonates, polyolefins, styrenic polymers, acrylic polymers, polyoxymethylene polymers, polyamides, polyphenylene oxides, polyphenylene sulfides, polyvinylchlorides, chlorinated polyvinyl chlorides, polylactic acids, or combinations thereof.

Polymers for use in the blends described herein include homopolymers and copolymers. Suitable examples include: (i) a polyolefin (PO), such as polyethylene (PE), polypropylene (PP), polybutene, ethylene propylene rubber (EPR), polyoxyethylene (POE), cyclic olefin copolymer (COC), or combinations thereof; (ii) a styrenic, such as polystyrene (PS), acrylonitrile butadiene styrene (ABS), styrene acrylonitrile (SAN), styrene butadiene rubber (SBR or HIPS), polyalphamethylstyrene, styrene maleic anhydride (SMA), styrene-butadiene copolymer (SBC) (such as styrene-butadiene-styrene copolymer (SBS) and styrene-ethylene/butadiene-styrene copolymer (SEBS)), styrene-ethylene/propylene-styrene copolymer (SEPS), styrene butadiene latex (SBL), SAN modified with ethylene propylene diene monomer (EPDM) and/or acrylic elastomers (for example, PS-SBR copolymers), or combinations thereof; (iii) a thermoplastic polyurethane (TPU) other than those described above; (iv) a polyamide, such as Nylon™, including polyamide 6,6 (PA66), polyamide 1,1 (PA11), polyamide 1,2 (PA12), a copolyamide (COPA), or combinations thereof; (v) an acrylic polymer, such as polymethyl acrylate, polymethylmethacrylate, a methyl methacrylate styrene (MS) copolymer, or combinations thereof; (vi) a polyvinylchloride (PVC), a chlorinated polyvinylchloride (CPVC), or combinations thereof; (vii) a polyoxyemethylene, such as polyacetal; (viii) a polyester, such as polyethylene terephthalate (PET), polybutylene terephthalate (PBT), copolyesters and/or polyester elastomers (COPE) including polyether-ester block copolymers such as glycol modified polyethylene terephthalate (PETG), polylactic acid (PLA), polyglycolic acid (PGA), copolymers of PLA and PGA, or combinations thereof; (ix) a polycarbonate (PC), a polyphenylene sulfide (PPS), a polyphenylene oxide (PPO), or combinations thereof; or combinations thereof.

In some embodiments, these blends include one or more additional polymeric materials selected from groups (i), (iii), (vii), (viii), or some combination thereof. In some embodiments, these blends include one or more additional polymeric materials selected from group (i). In some embodiments, these blends include one or more additional polymeric materials selected from group (iii). In some embodiments, these blends include one or more additional polymeric materials selected from group (vii). In some embodiments, these blends include one or more additional polymeric materials selected from group (viii).

The additional additives suitable for use in the TPU compositions described herein are not overly limited. Suitable additives include pigments, UV stabilizers, UV absorbers, antioxidants, lubricity agents, heat stabilizers, hydrolysis stabilizers, cross-linking activators, flame retardants, layered silicates, fillers, colorants, reinforcing agents, adhesion mediators, impact strength modifiers, antimicrobials, and any combination thereof.

In some embodiments, the additional component is a flame retardant. Suitable flame retardants are not overly limited and may include a boron phosphate flame retardant, a magnesium oxide, a dipentaerythritol, a polytetrafluoroethylene (PTFE) polymer, or any combination thereof. In some embodiments, this flame retardant may include a boron phosphate flame retardant, a magnesium oxide, a dipentaerythritol, or any combination thereof. A suitable example of a boron phosphate flame retardant is BUDIT 326, commercially available from Budenheim USA, Inc. When present, the flame retardant component may be present in an amount from 0 to 10 weight percent of the overall TPU composition, in other embodiments from 0.5 to 10, or from 1 to 10, or from 0.5 or 1 to 5, or from 0.5 to 3, or even from 1 to 3 weight percent of the overall TPU composition.

The TPU compositions described herein may also include additional additives, which may be referred to as a stabilizer. The stabilizers may include antioxidants such as phenolics, phosphites, thioesters, and amines, light stabilizers such as hindered amine light stabilizers and benzothiazole UV absorbers, and other process stabilizers and combinations thereof. In one embodiment, the preferred stabilizer is Irganox 1010 from BASF and Naugard 445 from Chemtura. The stabilizer is used in the amount from about 0.1 weight percent to about 5 weight percent, in another embodiment from about 0.1 weight percent to about 3 weight percent, and in another embodiment from about 0.5 weight percent to about 1.5 weight percent of the TPU composition.

In addition, various conventional inorganic flame retardant components may be employed in the TPU composition. Suitable inorganic flame retardants include any of those known to one skilled in the art, such as metal oxides, metal oxide hydrates, metal carbonates, ammonium phosphate, ammonium polyphosphate, calcium carbonate, antimony oxide, clay, mineral clays including talc, kaolin, wollastonite, nanoclay, montmorillonite clay which is often referred to as nano-clay, and mixtures thereof. In one embodiment, the flame retardant package includes talc. The talc in the flame retardant package promotes properties of high limiting oxygen index (LOI). The inorganic flame retardants may be used in the amount from 0 to about 30 weight percent, from about 0.1 weight percent to about 20 weight percent, in another embodiment about 0.5 weight percent to about 15 weight percent of the total weight of the TPU composition.

Still further optional additives may be used in the TPU compositions described herein. The additives include colorants, antioxidants (including phenolics, phosphites, thioesters, and/or amines), antiozonants, stabilizers, inert fillers, lubricants, inhibitors, hydrolysis stabilizers, light stabilizers, hindered amines light stabilizers, benzotriazole UV absorber, heat stabilizers, stabilizers to prevent discoloration, dyes, pigments, inorganic and organic fillers, reinforcing agents and combinations thereof.

All of the additives described above may be used in an effective amount customary for these substances. The non-flame retardants additives may be used in amounts of from about 0 to about 30 weight percent, in one embodiment from about 0.1 to about 25 weight percent, and in another embodiment about 0.1 to about 20 weight percent of the total weight of the TPU composition.

These additional additives can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

The TPU materials described above may be prepared by a process that includes the step of (I) reacting: a) the polyisocyanate component described above; b) the polyol component described above; and c) the chain extender component described above, where the reaction may be carried out in the presence of a catalyst, resulting in a thermoplastic polyurethane composition.

The process may further include the step of: (II) mixing the TPU composition of step (I) with one or more blend components, including one or more additional TPU materials and/or polymers, including any of those described above.

The process may further include the step of: (II) mixing the TPU composition of step (I) with one or more of the additional additives described above.

The process may further include the step of: (II) mixing the TPU composition of step (I) with one or more blend components, including one or more additional TPU materials and/or polymers, including any of those described above, and/or the step of: (III) mixing the TPU composition of step (I) with one or more of the additional additives described above.

While not wishing to be bound by theory it is believed that any TPU that meets the requirements described herein will be better suited for freeform fabrication, in particular the fused deposition modeling, than any TPU that do not. The necessary parameters are believed to be a relatively high crystallization temperature and a relatively high retention of modulus over temperature increases. While not wishing to be bound by theory it believed that having a relatively high crystallization temperature provides a better operating window for freeform fabrication, in particular fused deposition modeling, and a relatively high retention of modulus allows the thermoplastic polyurethane to maintain more of its structural integrity during processing, which is a necessary attribute for freeform fabrication, in particular fused deposition modeling. The combination of these parameters is believed to provide TPU well suited for freeform fabrication, in particular fused deposition modeling.

In some embodiments, the TPU useful in the disclosed technology has a crystallization temperature above 80° C. and retains more than 20% of its shear storage modulus at 100° C. relative to its shear storage modulus at 20° C.

In some embodiments, the TPU has a crystallization temperature greater than 100, 105, 110, or even greater than 115° C., or even of about °117. In some embodiments, the crystallization temperature is no more than 200, 150, or even 120° C.

In some embodiments, the TPU retains more than 50% of its shear storage modulus at 50° C. relative to its shear storage modulus at 20° C.; retains more than 42% of its shear storage modulus at 100° C. relative to its shear storage modulus at 50° C.; retains more than 20% of its shear storage modulus at 150° C. relative to its shear storage modulus at 120° C.; or any combination thereof.

In some embodiments, the TPU retains more than 60% of its shear storage modulus at 50° C. relative to its shear storage modulus at 20° C.; retains more than 30% of its shear storage modulus at 100° C. relative to its shear storage modulus at 20° C.; or any combination thereof.

In some embodiments, the TPU retains more than 45% of its shear storage modulus at 100° C. relative to its shear storage modulus at 50° C.; retains more than 70% of its shear storage modulus at 120° C. relative to its shear storage modulus at 100° C.; retains more than 5% of its shear storage modulus at 105° C. relative to its shear storage modulus at 20° C.; or any combination thereof.

In still other embodiments, the TPU exhibits a shear storage modulus to shear loss modulus crossover temperature (i.e., the temperature where the ratio of the shear storage modulus, G', to shear loss modulus, G", is 1) or more than 170° C., or even more than 180° C. In some embodiments, this shear storage modulus to shear loss modulus crossover temperature is in addition to the crystallization temperature and shear storage modulus retention parameters described above. In other embodiments, the shear storage modulus to shear loss modulus crossover temperature can replace the shear storage modulus retention parameters described above.

The Systems and Methods.

The solid freeform fabrication systems, in particular the fused deposition modeling systems, and the methods of using the same useful in the described technology are not overly limited. It is noted that the described technology provides certain thermoplastic polyurethanes that are better suited for solid freeform fabrication systems, in particular fused deposition modeling systems, than other thermoplastic polyurethanes, and the key to the described technology is that relative benefit. It is noted that some solid freeform fabrication systems, including some fused deposition modeling systems may be better suited for processing certain materials, including thermoplastic polyurethanes, due to their equipment configurations, processing parameters, etc. However, the described technology is not focused on the details of solid freeform fabrication systems, including some fused deposition modeling systems, rather the described technology is focused on providing certain thermoplastic polyurethanes that are better suited for solid freeform fabrication systems generally, in particular fused deposition modeling systems generally.

The fused deposition modeling (FDM) systems useful in the described technology include systems that build parts layer-by-layer by heating the building material to a semi-liquid state and extruding it according to computer-controlled paths. The material may be dispensed as a semi-continuous flow and/or filament of material from the dispenser or it may alternatively be dispensed as individual droplets. FDM uses often use two materials to complete a build. A modeling material is used to constitute the finished piece. A support material may also be used to acts as scaffolding for the modeling material. Material filaments are fed from the systems material stores to its print head, which typically moves in a two dimensional plane, depositing material to complete each layer before the base moves along a third axis to a new level and/or plane and the next layer begins. Once the system is done building, the user may remove the support material away or even dissolve it, leaving a part that is ready to use.

The disclosed technology further provides the use of the described thermoplastic polyurethanes in the described systems and methods, and the articles made from the same.
The Articles.

The systems and methods described herein may utilize the thermoplastic polyurethanes described herein and produce various objects and/or articles. Objects and/or articles made with the disclosed technology are not overly limited.

In some embodiments, the object and/or article comprises cook and storage ware, furniture, automotive components, toys, sportswear, medical devices, personalized medical articles, replicated medical implants, dental articles, sterilization containers, drapes, gowns, filters, hygiene products, diapers, films, sheets, tubes, pipes, wire jacketing, cable jacketing, agricultural films, geomembranes, sporting equipment, cast film, blown film, profiles, boat and water craft components, crates, containers, packaging, labware, office floor mats, instrumentation sample holders, liquid storage containers, packaging material, medical tubing and valves, a footwear component, a sheet, a tape, a carpet, an adhesive, a wire sheath, a cable, a protective apparel, an automotive part, a coating, a foam laminate, an overmolded article, an automotive skin, an awning, a tarp, a leather article, a roofing construction article, a steering wheel, a powder coating, a powder slush molding, a consumer durable, a grip, a handle, a hose, a hose liner, a pipe, a pipe liner, a caster wheel, a skate wheel, a computer component, a belt, an applique, a footwear component, a conveyor or timing belt, a glove, a fiber, a fabric, or a garment.

Additional articles that may be used in the present invention includes, jewelry, customized keep shakes and/or collectibles, such as but not limited to coins medallions, frames and picture frames, eyewear frames, keys, cups, mugs, miniatures and models, wrist bands, personalized action figures, and the like.

As with all additive manufacturing there is particular value for such technology in making articles as part of rapid prototyping and new product development, as part of making custom and/or one time only parts, or similar applications where mass production of an article in large numbers is not warranted and/or practical.

More generally, the compositions of the invention, including any blends thereof, may be useful in a wide variety of applications, including transparent articles such as cook and storage ware, and in other articles such as automotive components, sterilizable medical devices, fibers, woven fabrics, nonwoven fabrics, oriented films, and other such articles. The compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Other useful articles and goods may be formed from the compositions of the invention including: labware, such as roller bottles for culture growth and media bottles, instrumentation sample windows; liquid storage containers such as bags, pouches, and bottles for storage and IV infusion of blood or solutions; packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, hoses, pipes, and such, including liners and/or jackets thereof. In some embodiments, the articles of the invention are fire hoses that include a liner made from the TPU compositions described herein. In some embodiments, the liner is a layer applied to the inner jacket of the fire hose.

Still further useful applications and articles include: automotive article including air bag covers, interior surfaces of automobiles; biomedical devices including implantable devices, pacemaker leads, artificial hearts, heart valves, stent coverings, artificial tendons, arteries and veins, implants containing pharmaceutically active agents, medical bags, medical tubing, drug delivery devices such as intravaginal rings, and bioabsorbable implants; shoe related articles including an upper and a sole, where the sole may include an insole, a midsole, and an outsole, adhesive systems to connect any of the parts described, other footwear parts including adhesives and fabric coatings, cleats, membranes, gas bladders, gel bladders or fluid bladders, inflated or inflatable inserts, laminated inserts, cushioning devices, soles made with microspheres, heels, wheels embedded in the shoe sole, inflatable tongues, woven and unwoven fabric, odor and moisture absorbent pads, pressurized ankle collars, eyelets and laces, orthotic device or insert, gel pads, resilient pads, barrier membranes and fabrics, and artificial leather; golf ball related articles including 2 piece and 3 piece golf balls, including the cover and the core.

Of particular relevance are personalized medical articles, such as orthotics, implants, bones, dental items, veins, etc., that are customized to the patient. For example, bone sections and/or implants may be prepared using the systems and methods described above, for a specific patient where the implants are designed specifically for the patient.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

It is known that some of the materials described above may interact in the final formulation, so that the components of the final formulation may be different from those that are initially added. For instance, metal ions (of, e.g., a flame retardant) can migrate to other acidic or anionic sites of other molecules. The products formed thereby, including the products formed upon employing the composition of the technology described herein in its intended use, may not be susceptible of easy description. Nevertheless, all such modifications and reaction products are included within the scope of the technology described herein; the technology described herein encompasses the composition prepared by admixing the components described above.

EXAMPLES

The technology described herein may be better understood with reference to the following non-limiting examples.

Materials.

Several thermoplastic polyurethanes (TPU) are prepared and evaluated for their suitability of use in fused deposition modeling. TPU-A is polyester TPU with a molar ratio of chain extender to polyol of about 1.4 and a hard segment content of about 50%. TPU-B is polyether TPU with a molar ratio of chain extender to polyol of about 2.0 and a hard segment content of about 48%. TPU-C is polyester TPU with a molar ratio of chain extender to polyol of about 3.9 and a hard segment content of about 52%. TPU-D is polyether TPU with a molar ratio of chain extender to polyol of about 3.7 and a hard segment content of about 43%.

Each TPU material is tested to determine its suitability for use in fused deposition modeling processes. The results of this testing are summarized below. All modulus data is collected by ASTM D5279.

TABLE 1

Summary of TPU Properties related to FDM processing

|  | TPU-A | TPU-B | TPU-C | TPU-D |
| --- | --- | --- | --- | --- |
| Tc (° C.) | 73 | 99 | 102 | 117 |
| Tm (° C.) | 130 | 140 | 170 | 192 |
| G' at 20° C. (mPa) | 37.9 | 12.4 | 36.5 | 17.1 |
| G' at 50° C. (mPa) | 18.2 | 10.1 | 18.8 | 14.8 |
| G' at 100° C. (mPa) | 7.4 | 4.4 | 9.0 | 7.9 |
| G' at 120° C. (mPa) |  | 2.8 | 6.7 | 5.5 |
| G' at 150° C. (mPa) | 0.83 | 0.5 | 3.6 | 1.5 |
| G'/G" crossover (° C.) | 165 | 178 | 188 | 178 |

Using the data above, percent retention of the shear storage modulus is calculated and summarized in the table below.

TABLE 2

Summary of Shear Storage Modulus Retention

|  | TPU-A | TPU-B | TPU-C | TPU-D |
| --- | --- | --- | --- | --- |
| Retention from 20° C. to 50° C. | 48% | 81% | 52% | 87% |
| Retention from 20° C. to 100° C. | 20% | 35% | 25% | 46% |
| Retention from 20° C. to 120° C. |  | 23% | 18% | 32% |
| Retention from 20° C. to 150° C. | 2% | 4% | 10% | 9% |
| Retention from 50° C. to 100° C. | 41% | 44% | 48% | 53% |
| Retention from 100° C. to 120° C. |  | 64% | 74% | 70% |
| Retention from 120° C. to 150° C. |  | 18% | 54% | 27% |

The results above indicate TPU-A is the least suitable for fused deposition modeling, while TPU-B, TPU-C, and TPU-D are better suited for fused deposition modeling. These results match with results seen to date in the testing of each TPU material in fused deposition modeling systems.

Molecular weight distributions can be measured on the Waters gel permeation chromatograph (GPC) equipped with Waters Model 515 Pump, Waters Model 717 autosampler and Waters Model 2414 refractive index detector held at 40° C. The GPC conditions may be a temperature of 40° C., a column set of Phenogel Guard+2x mixed D (5u), 300×7.5 mm, a mobile phase of tetrahydrofuran (THF) stabilized with 250 ppm butylated hydroxytoluene, a flow rate of 1.0 ml/min, an injection volume of 50 μl, sample concentration ~0.12%, and data acquisition using Waters Empower Pro Software. Typically a small amount, typically approximately 0.05 gram of polymer, is dissolved in 20 ml of stabilized HPLC-grade THF, filtered through a 0.45-micron polytetrafluoroethylene disposable filter (Whatman), and injected into the GPC. The molecular weight calibration curve may be established with EasiCal® polystyrene standards from Polymer Laboratories.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the technology described herein can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration. That is "consisting essentially of" permits the inclusion of substances that do not materially affect the basic and novel characteristics of the composition under consideration.

While certain representative embodiments and details have been shown for the purpose of illustrating the subject technology described herein, it will be apparent to those skilled in this art that various changes and modifications can be made therein without departing from the scope of the subject invention. In this regard, the scope of the technology described herein is to be limited only by the following claims.

What is claimed is:

1. A method of fabricating a three-dimensional object, comprising the step of: operating a system for solid freeform fabrication of a three-dimensional object;
   wherein said system comprises a solid freeform fabrication apparatus that deposits a semi-continuous flow or filament of building materials in a controlled manner; so as to form the three-dimensional object;
   wherein said building materials comprise a thermoplastic polyurethane derived from (a) a polyisocyanate component, (b) a polyol component, and (c) a chain extender component, wherein the mole ratio of the chain extender to the polyol is greater than 1.5;
   wherein the resulting thermoplastic polyurethane has a crystallization temperature above 80° C.; and
   wherein the resulting thermoplastic polyurethane retains more than 20% of its shear storage modulus at 100° C. relative to its shear storage modulus at 20° C.

2. The method of claim 1, wherein said solid freeform fabrication apparatus comprises (a) a plurality of dispensing heads; (b) a building material supply apparatus configured to supply a plurality of building materials to said fabrication apparatus; and (c) a control unit configured for controlling said fabrication apparatus and said building material supply apparatus, based on an operation mode selected from a plurality of predetermined operation modes.

3. The method of claim 1, wherein said solid freeform fabrication apparatus comprises a fused deposition modeling apparatus.

4. The method of claim 1, wherein the polyol has a number average molecular weight of at least 900.

5. The method of claim 1, wherein the polyisocyanate component comprises an aromatic diisocyanate.

6. The method of claim 1, wherein the polyisocyanate component comprises 4,4'-methylenebis(phenyl isocyanate).

7. The method of claim 1, wherein the polyol component comprises a polyether polyol, a polyester polyol, or a combination thereof.

8. The method of claim 1, wherein the polyol component comprises poly(tetramethylene ether glycol), polybutylene adipate, or a combination thereof.

9. The method of claim 1, wherein the chain extender component comprises a linear alkylene diol.

10. The method of claim 1, wherein the polyol component comprises poly(tetramethylene ether glycol).

11. The method of claim 1, wherein the polyol component comprises polybutylene adipate.

12. The method of claim 1, wherein the chain extender component comprises 1,4-butanediol.

13. The method of claim 1, wherein the thermoplastic polyurethane further comprises one or more colorants, antioxidants (including phenolics, phosphites, thioesters, and/or amines), antiozonants, stabilizers, inert fillers, lubricants, inhibitors, hydrolysis stabilizers, light stabilizers, hindered amines light stabilizers, benzotriazole UV absorber, heat stabilizers, stabilizers to prevent discoloration, dyes, pigments, inorganic and organic fillers, reinforcing agents, or any combinations thereof.

* * * * *